United States Patent [19]
Hon et al.

[11] Patent Number: 5,602,960
[45] Date of Patent: Feb. 11, 1997

[54] CONTINUOUS MANDARIN CHINESE SPEECH RECOGNITION SYSTEM HAVING AN INTEGRATED TONE CLASSIFIER

[75] Inventors: Hsiao-Wuen Hon; Yen-Lu Chow; Kai-Fu Lee, all of Saratoga, Calif.

[73] Assignee: Apple Computer, Inc., Cupertino, Calif.

[21] Appl. No.: 316,257

[22] Filed: Sep. 30, 1994

[51] Int. Cl.$^6$ ........................................... G10L 3/02
[52] U.S. Cl. .................... 395/2.16; 395/2.63; 395/2.6
[58] Field of Search ................... 395/2, 2.14–2.16, 395/2.6–2.66; 381/41–43, 36–38

[56] References Cited

U.S. PATENT DOCUMENTS 5,220,639  6/1993  Lee ............................................. 395/2

OTHER PUBLICATIONS

ICASSP '93: Acoustics Speech & Signal Processing Conf. vol. 2, "A new framework for recognition of Mandarin syllables with Tones Using Sub–syllabic Units", Lin et al. pp. 227–230.

Schwartz and Chow, The N–Best Algorithm: An Efficient And Exact Procedure For Finding The N Most Likely Sentence Hypotheses, 1990, IEEE, 81–84.

*Primary Examiner*—Kee M. Tung
*Attorney, Agent, or Firm*—Greg T. Sueoka

[57] ABSTRACT

A speech recognition system for continuous Mandarin Chinese speech comprises a microphone, an A/D converter, a syllable recognition system, an integrated tone classifier, and a confidence score augmentor. The syllable recognition system generates N-best theories with initial confidence scores. The integrated tone classifier has a pitch estimator to estimate the pitch of the input once and a long-term tone analyzer to segment the estimated pitch according to the syllables of each of the N-best theories. The long-term tone analyzer performs long-term tonal analysis on the segmented, estimated pitch and generates a long-term tonal confidence signal. The confidence score augmentor receives the initial confidence scores and the long-term tonal confidence signals, modifies each initial confidence score according to the corresponding long-term tonal confidence signal, re-ranks the N-best theories according to the augmented confidence scores, and outputs the N-best theories.

20 Claims, 5 Drawing Sheets

CONTINUOUS MANDARIN CHINESE SPEECH RECOGNITION SYSTEM HAVING AN INTEGRATED TONE CLASSIFIER

CROSS-REFERENCE TO RELATED APPLICATIONS

The present invention relates to pending U.S. patent application Ser. No. 08/378,963, filed Jan. 26, 1995, invented by Hsiao-Wuen Hon and Bao-Sheng Yuan, entitled A System And Method For Generating And Using Context Dependent Sub-Syllable Models To Recognize A Tonal Language, which is incorporated herein by reference. The present invention also relates to pending U.S. patent application Ser. No. 08/315,222, filed Sept. 29, 1994, invented by Hsiao-Wuen Hon, entitled "A System And Method For Determining The Tone Of A Syllable Of Mandarin Chinese Speech," which is incorporated herein by reference.

BACKGROUND OF THE INVENTION

1. Field of the Invention.

The present invention relates generally to speech recognition systems. In particular, the present invention relates to a system and method for recognizing continuous Mandarin Chinese speech. The present invention further relates to a system and method for recognizing continuous speech of a tonal language using an integrated tone classifier.

2. Description of the Background Art.

Speech recognition systems for Mandarin Chinese and other tonal languages encounter unique problems not encountered by speech recognition systems for non-tonal languages such as Romance or Germanic languages. Mandarin Chinese is a tonal syllabic language where each syllable is assigned a tone. In Mandarin Chinese, there are 4 lexical tones (high and level, rising, falling-rising, and falling) and 1 neutral tone. Tone is characterized by the fundamental frequency contour, or pitch contour, of the audio signal. The pitch is equivalent to the fundamental frequency, and the pitch contour is equivalent to the fundamental frequency contour. Exemplary wave forms for electrical signals representing the tones of Mandarin Chinese are shown in FIGS. 1A, 1B, 1C, 1D, and 1E. The tone and syllable together define the meaning of the syllable. Syllables with the same phonetic structure, but different tones, usually have significantly different meanings. Thus, to recognize accurately an audio signal of Mandarin Chinese speech, a speech recognition system must recognize both the syllable and the tone of the syllable.

There are many prior art systems, similar to systems for non-tonal languages, that effectively analyze and identify isolated syllables of Mandarin Chinese speech. These systems have been quite successful in accurately recognizing isolated syllables. Such prior art systems generally first identify the syllable and second perform a tonal analysis. The systems then combine the results of the two steps to recognize the input.

Prior art systems that recognize continuous Mandarin Chinese speech have not been nearly as successful as systems that recognize isolated syllables. Continuous speech recognition systems must recognize both the syllable and tone of each of a plurality of syllables strung together in a continuous input. Existing continuous speech recognition systems first divide or segment an input into a sequence of fixed segments with hypothetical time alignment. The step of segmenting the input is particularly critical since errors in segmentation will propagate through and affect the recognition of both syllable and tone. There are, however, no segmentation techniques that correctly segment continuous Mandarin Chinese speech such that this approach yields enough accuracy to be satisfactory. Once these prior art systems have segmented the input, they generally use an isolated syllable recognizer and separate tone recognizer to identify each tonal syllable based on the hypothetical segments. This analysis is obviously dependent upon the segmentation step. These systems have an additional problem in that they use short-term tonal analysis which does not provide sufficient frequency resolution to identify correctly the behavior of the pitch (the fundamental frequency) contour. Moreover, the tone of a syllable may move through 3 octaves or more from one syllable to the next. In order to overcome the deficiencies of short-term tonal analysis and the difficult behavior of the tone, long-term tonal analysis is needed to model accurately the pitch contour. Long-term tonal analysis, however, is very sensitive to segmentation error. Furthermore, long-term tonal analysis is also is very time consuming. Time consumption is particularly important when a speech recognition system is being used for real-time speech applications.

In an attempt to reduce the effects of segmentation error on the ultimate recognition results, prior art continuous speech recognition systems provide multiple possible identifications of an input. Such systems determine multiple candidates for an input utterance and generate output signals of the N-best candidates or recognitions. A recognition is conventionally referred to as a theory. These systems often generate an initial confidence score with each possible recognition. Each initial confidence score is an indication of how accurately the theory matches the input. Generally, the recognition with the highest initial confidence score is accepted as the correct recognition. These prior art speech recognition systems have not utilized long-term tonal analysis because of the computational expense. Long-term tonal analysis is even more time consuming when it must be performed for each of the N-best theories.

Continuous speech recognition systems that produce multiple possible recognitions, still encounter the problem of incorporating long-term tonal analysis into an N-best recognizer. Thus, there continues to be a need for performing long-term tonal analysis, with minimal degradation due to segmentation error, for continuous speech of a tonal language.

SUMMARY OF THE INVENTION

The present invention overcomes the deficiencies and limitations of the prior art with a system and method for recognizing continuous Mandarin Chinese speech. The system comprises a microphone, an A/D converter, a syllable recognition system, an integrated tone classifier, and a confidence score augmentor. The system receives audio signals through the microphone which converts the audio signal into an analog, electrical signal. The A/D converter digitizes the electrical signal.

The syllable recognition system analyzes an input of continuous Mandarin Chinese speech and generates N-best theories. Each theory is divided into one or more syllables The syllable recognition system determines the phonetic structure of each syllable of each segmentation pattern and might perform short-term tonal analysis to determine the tone of each syllable of each theory. A segmentation pattern is a possible division of the input into discrete syllables. The syllable recognition system combines the identified syllables and tones of each segmentation pattern into a theory and determines an initial confidence score for each theory. The initial confidence score indicates the determination of the syllable recognition system of how well the phonetic structure and tone of the theory match the phonetic structures and tones of the language. The syllable recognition system ranks the theories by initial confidence score and generates an output of the N-best theories with their initial confidence scores.

The integrated tone classifier comprises a pitch estimator and a long-term tone analyzer. The pitch estimator receives the digitized input from the A/D converter and estimates the pitch of the input. The integrated tone classifier estimates the pitch only once; thus reducing the computation time required for long-term tonal analysis. The long-term tone analyzer receives the estimated pitch from the pitch estimator and the N-best theories from the syllable recognition system. The long-term tone analyzer segments the estimated pitch according to the syllables of each of the theories and determines how well the estimated pitch, as segmented, matches the tones of the language. The long-term tone analyzer generates a long-term tonal confidence signal for each theory. The long-term tonal confidence signal indicates how well the syllables of the theory match the tones of the language. The integrated tone classifier outputs the long-term tonal confidence signals to the confidence score augmentor.

The confidence score augmentor receives the N-best theories and initial confidence scores and the long-term tonal confidence signals from integrated tone classifier. The confidence score augmentor modifies the initial confidence score of each theory according to its corresponding long-term tonal confidence signal. The confidence score augmentor re-ranks the theories according to the augmented confidence scores and generates an output of the re-ranked theories with augmented confidence scores.

The present invention also includes a method for recognizing an input of continuous Mandarin Chinese speech. The method begins by generating N-best theories using syllable recognition, also referred to as phonetic identification, and possibly includes short-term tonal analysis techniques. The method estimates the pitch of the input and then segments the estimated pitch into units according to the syllable segmentation of a theory. Each unit is then analyzed using long-term tonal analysis techniques and a long-term tonal confidence signal is generated for each theory. The method finally modifies the initial confidence scores, generated by the phonetic identification and short-term tonal analysis, according to their corresponding long-term tonal confidence signal and re-ranks the theories.

DETAILED DESCRIPTION OF THE PREFERRED EMBODIMENTS

Referring now to FIGS. 1A, 1B, 1C, 1D, and 1E, graphical representations of the fundamental frequency behavior of electrical signals that represent the 4 lexical tones and 1 neutral tone of Mandarin Chinese speech are shown. The signals shown in FIGS. 1A, 1B, 1C, 1D, and 1E originate as audio signals generated by a human speaker. A speech recognition system 76 receives the audio signals through a microphone 40. The microphone 40 converts the audio signal to an electrical signal. Each syllable of Mandarin Chinese speech has a tone. The tone is the behavior of the fundamental frequency contour, or pitch, of the audio signal of the syllable. The tone is preserved when the audio signal is converted into an electrical signal. Thus, the tone of a syllable may refer to the behavior of the fundamental frequency contour of the audio signal or the behavior of the fundamental frequency of the electrical signal into which the audio signal is converted.

Figure 1A:
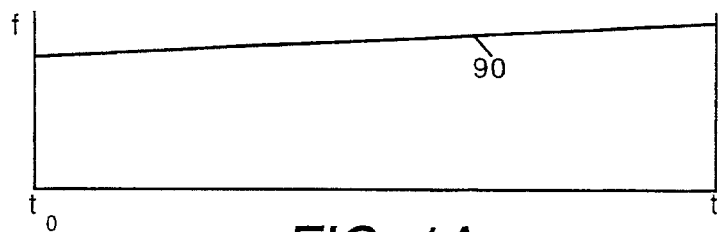
FIGS. 1A, 1B, 1C, 1D, and 1E are graphical representations of electrical signals having the behaviors of the 4 lexical tones and one neutral tone of Mandarin Chinese speech.
Figure 1B:
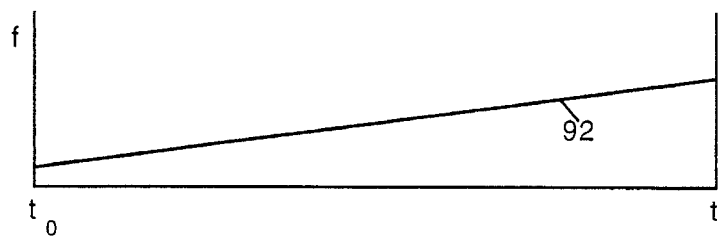
Figure 1C:
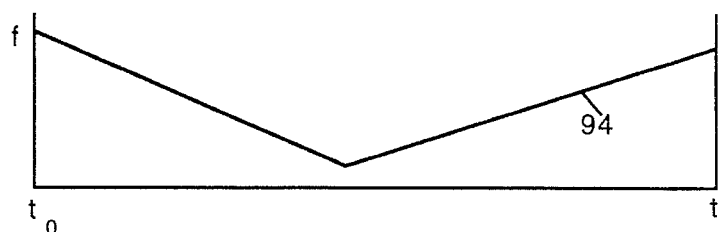
Figure 1D:
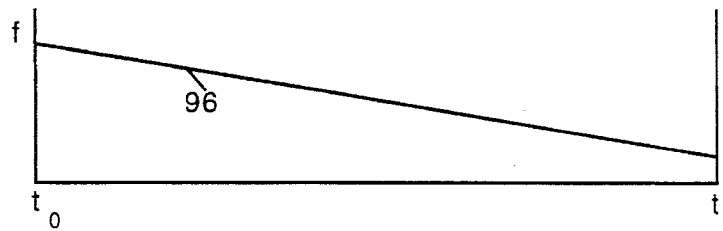
Figure 1E:
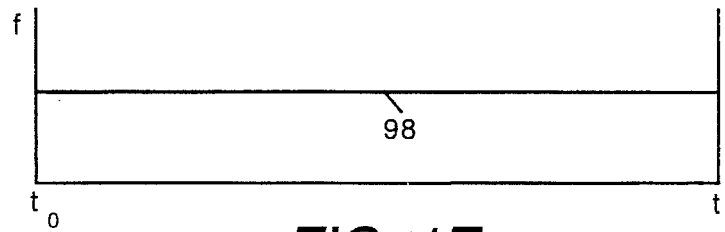

FIGS. 1A, 1B, 1C, 1D, and 1E show the tones of Mandarin Chinese speech as the behavior of the fundamental frequency plotted as a function of time. FIG. 1A shows a first tone signal 90 having a high and level tone. FIG. 1B shows a second tone signal 92 having a rising tone. A third tone signal 94, shown in FIG. 1C, has a falling-rising behavior. FIG. 1D shows a fourth tone signal 96 having a behavior of the last lexical tone of Mandarin Chinese speech, the falling tone. Finally, FIG. 1E shows a fifth tone signal 98 having the neutral tone.

Figure 2:
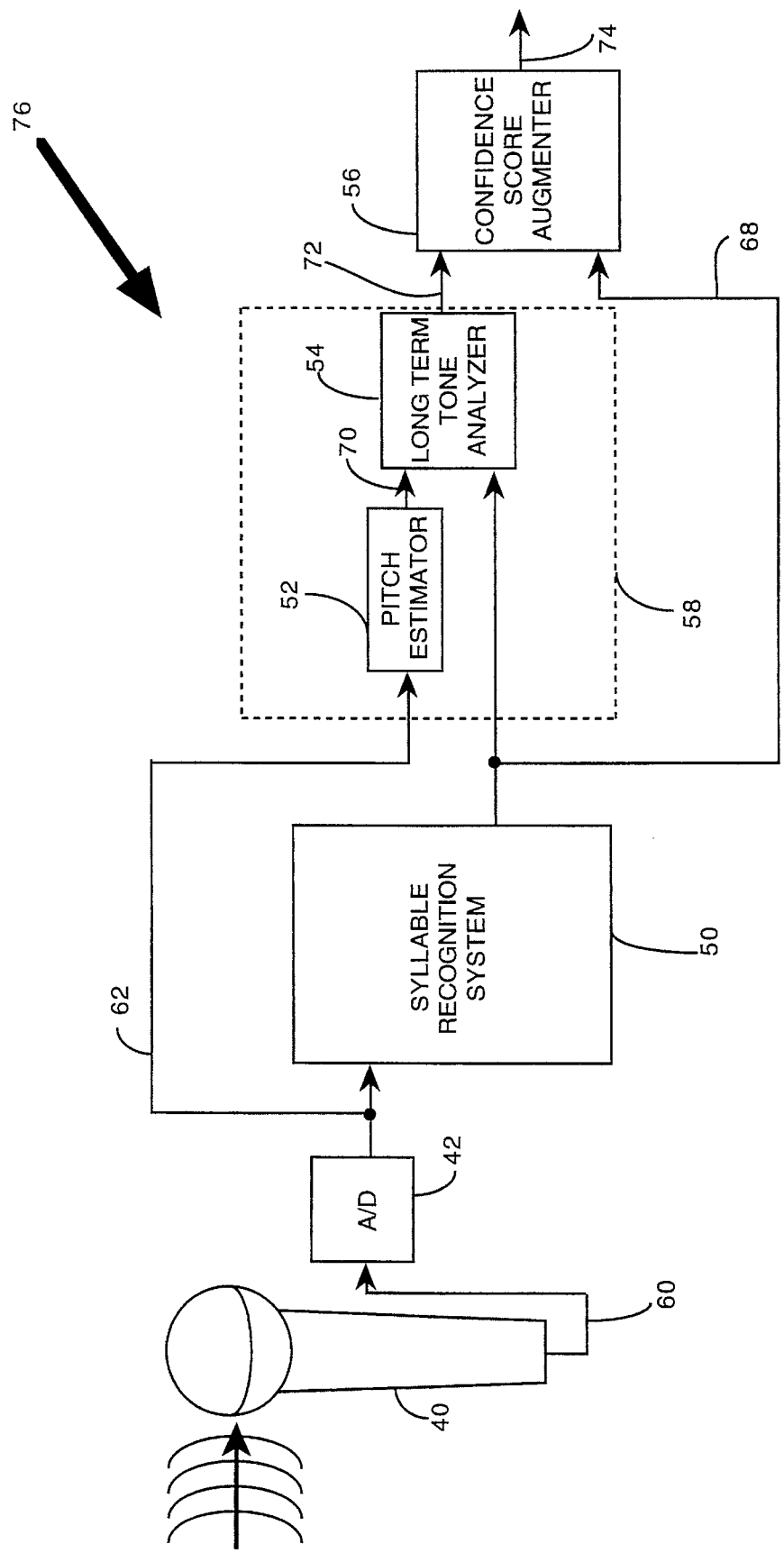
FIG. 2 is a block diagram of a first embodiment of the system of the present invention for recognizing continuous Mandarin Chinese.

Referring now to FIG. 2, a block diagram of a first embodiment of a system 76 for recognizing continuous Mandarin Chinese speech is shown. The system 76 comprises a microphone 40, an analog-to-digital converter 42, a syllable recognition system 50, an integrated tone classifier 58, and a confidence score augmentor 56. The system 76 receives an input of an audio signal of continuous Mandarin Chinese speech through the microphone 40. The microphone 40 is a conventional microphone for converting audio signals into electrical signals. The microphone 40 has an input for receiving audio signals and an output for transmitting analog, electrical signals. The microphone 40 transforms the audio signal into an analog electrical signal and transmits the analog electrical signal on a line 60 that is coupled to the output of the microphone 40. The line 60 is also coupled to an input of the analog-to-digital converter 42. The analog-to-digital converter ("A/D converter") 42 is a conventional A/D converter for digitizing analog, electrical signals. The A/D converter 42 has a single input, coupled to the line 60, and a single output, coupled to a line 62. The A/D converter 42 converts the input analog, electrical signal into a digital, electrical signal and outputs the digital, electrical signal on the line 62.

The line 62 is coupled to an input of the syllable recognition system 50 and to a first input of the integrated tone classifier 58. The syllable recognition system 50 receives the digitized output signal from the A/D converter 42 and generates N-best theories with initial confidence scores. The syllable recognition system 50 asserts the theories and confidence scores on a line 68, which is coupled to an output of the syllable recognition system 50. Each output comprises at least one theory, which is a possible recognition (a sequence of syllables with time segmentation) of the input signal, and an initial confidence score, which indicates the confidence of the syllable recognition system 50 in correctly recognizing the input signal. There are many ways that the initial confidence score may indicate the confidence of the syllable recognition system 50 that it accurately recognized the input signal. For example, the confidence scores may take on values in a range such as from 0 to 100. In this case, a value of 100 represents the maximum confidence of the syllable recognition system 50, and initial confidence scores with greater value represent greater confidence. Alternatively, the initial confidence scores may take on values between 0 and 1 with 0 representing the maximum confidence of the syllable recognition system 50. In this case, the lower the initial confidence score the greater the confidence level. There are many different techniques for generating initial confidence scores; those skilled in the art will recognize these techniques. The syllable recognition system 50 preferably generates a plurality of theories with accompanying initial confidence scores but outputs only the N-best theories. N is a pre-defined value and is preferably set by the system developer according to his/her application's requirements. The syllable recognition system 50 is preferably an Apple Plaintalk Chinese Syllable Recognition System from Apple Computer, Inc. of Cupertino, California. The syllable recognition system 50 may alternately be a syllable based voice typewriter from Star Incorporated of the People's Republic of China.

Line 62, which provides the output of the A/D converter 42, is coupled to the first input of the integrated tone classifier 58. Line 68 is coupled to a second input of the integrated tone classifier 58. Systems for Mandarin Chinese speech recognition, which include the integrated tone classifier 58 of the present invention, overcome the deficiencies and limitations of the prior art speech recognition systems. In particular, the integrated tone classifier 58 quickly and efficiently applies long-term tonal analysis to the output of the syllable recognition system 50. Long-term tonal analysis allows the system 76 to determine accurately the tone of the input and thus, greatly improves the accuracy of the recognition of an input audio signal.

The integrated tone classifier 58 preferably comprises a pitch estimator 52 and a long-term tone analyzer 54. The pitch estimator 52 estimates the pitch, or fundamental frequency, of the entire digitized input signal. The pitch estimator 52 has a single input that forms the first input of the integrated tone classifier 58 and that is coupled to line 62 to receive the digitized input signal. The pitch estimator 52 determines the pitch of the entire input signal and provides a pitch signal to the long-term tone analyzer 54. The pitch estimator 52 uses fourier analysis to determine the behavior of the fundamental frequency of the input signal. The pitch estimator 52 may alternately use a low pass filter to determine the pitch of the input signal. There are many other techniques that may be used to determine the pitch of the input signal. Those skilled in the art will recognize these techniques. The pitch estimator 52 preferably determines the pitch of the input signal only once. In this way, the present invention eliminates the repeated determination of the pitch for the N-best theories of the syllable recognition system 50 which is computationally expensive. The present invention advantageously performs pitch estimation first for the entire input utterance and then divides the pitch signal in different ways according to the segmentation of each of the N-best theories. Thus, the present invention overcomes the deficiency and limitation of undue delay of the prior art systems that attempted to apply long-term tonal analysis.

The output of the pitch estimator 52 is coupled to a first input of the long-term tone analyzer 54 by a line 70 so that the long-term tone analyzer 54 receives the estimated pitch signal. A second input of the long-term tone analyzer 54 forms the second input of the integrated tone classifier 58 and is coupled to the line 68 to receive the N-best theories, with their initial confidence scores, from the syllable recognition system 50. The long-term tone analyzer 54 includes a memory device for storing the estimated pitch signal from the pitch estimator 52. The long-term tone analyzer 54 is preferably the system described in co-pending U.S. patent application entitled "A System And Method For Determining The Tone Of A Syllable 0f Mandarin Chinese Speech" which is incorporated herein by reference. The long-term tone analyzer 54 may alternately be a system as described by Chih-Heng Lin, Lin-Shan Lee, and Pei-Yih Ting in "A New Framework For Recognition Of Mandarin Syllables With Tones Using Sub-Syllabic Units. Published in the Proceedings of the Institute of Electrical and Electronic Engineers, 1993. The long-term tone analyzer 54 segments the estimated pitch signal into units according to each of the N-best theories from the syllable recognition system 50. Each unit is equal in duration to a corresponding syllable of a theory. For example, for the highest ranked theory, the long-term tone analyzer 54 divides the pitch signal into the same number of units as the number of syllables contained in the theory. Each unit has a duration equal to its corresponding syllable. Thus, the present invention reduces the effect of segmentation error by using the syllable recognition system 50 as a sophisticated segmenter and allows for different segmentations for each of the N-best theories. The output of the syllable recognition system 50 is the N-best theories that the syllable recognition system 50 was able to determine. By segmenting the pitch signals according to the syllables of the N-best output, the long-term tone analyzer 54 uses segmentation patterns that the syllable recognition system 50 has already determined to be the N-best matches. The integrated tone classifier 58 performs long-term tonal analysis on the input audio signal that is optimally segmented. This greatly improves the accuracy of the recognition.

The long-term tone analyzer 54 then compares each unit to the 4 lexical tones and one neutral tone of Mandarin Chinese speech and generates a long-term confidence signal that indicates how well the units match the tones. The long-term tone analyzer 54 preferably uses the system described in copending U.S. patent application entitled "A System And Method For Determining The Tone Of A Syllable Of Mandarin Chinese Speech," which is incorporated herein by reference. The long-term confidence signal is normalized so that the signals of theories having different numbers of syllables can be compared. Other tonal languages have different numbers of tones; for these languages, the long-term tone analyzer 54 would compare the units to all tones of the tonal language. The long-term tone analyzer 54 then outputs the long-term tonal confidence signals for each of the N-best theories on a line 72 that is coupled to its output. The output of the long-term tone analyzer 54 forms the output of the integrated tone classifier 58.

The line 72 is coupled to a first input of a confidence score augmentor 56. The line 68, which is coupled to the output of the syllable recognition system 50 is also coupled to a second input of the confidence score augmentor 56. The confidence score augmentor 56 modifies the initial confidence scores received from the syllable recognition system 50 according to the long-term tonal confidence signals generated by the integrated tone classifier 58. For example, the confidence score augmentor 56 may adjust the initial confidence scores by adding the corresponding long-term tonal confidence signal to each of the initial confidence scores. More specifically, the augmented confidence score output of the confidence score augmentor 56 may be a signal that is the sum of 50% of the initial confidence score and 50% of the long-term confidence signal. The percentage weighting for the initial confidence score and the long-term confidence signal may be adjusted by the system developer as desired to account for the weighting that the integrated tone classifier 58 will provide in the overall recognition. There are many different techniques for combining the initial confidence scores and the long-term tonal confidence signals; those skilled in the art will recognize these techniques. The confidence score augmentor 56 then re-ranks the N-best theories according to their augmented confidence scores and outputs the results on a line 74. Line 74 may be coupled to a look up table and from there to a memory, as in a dictation machine, or to a display device, or to both.

Figure 3:
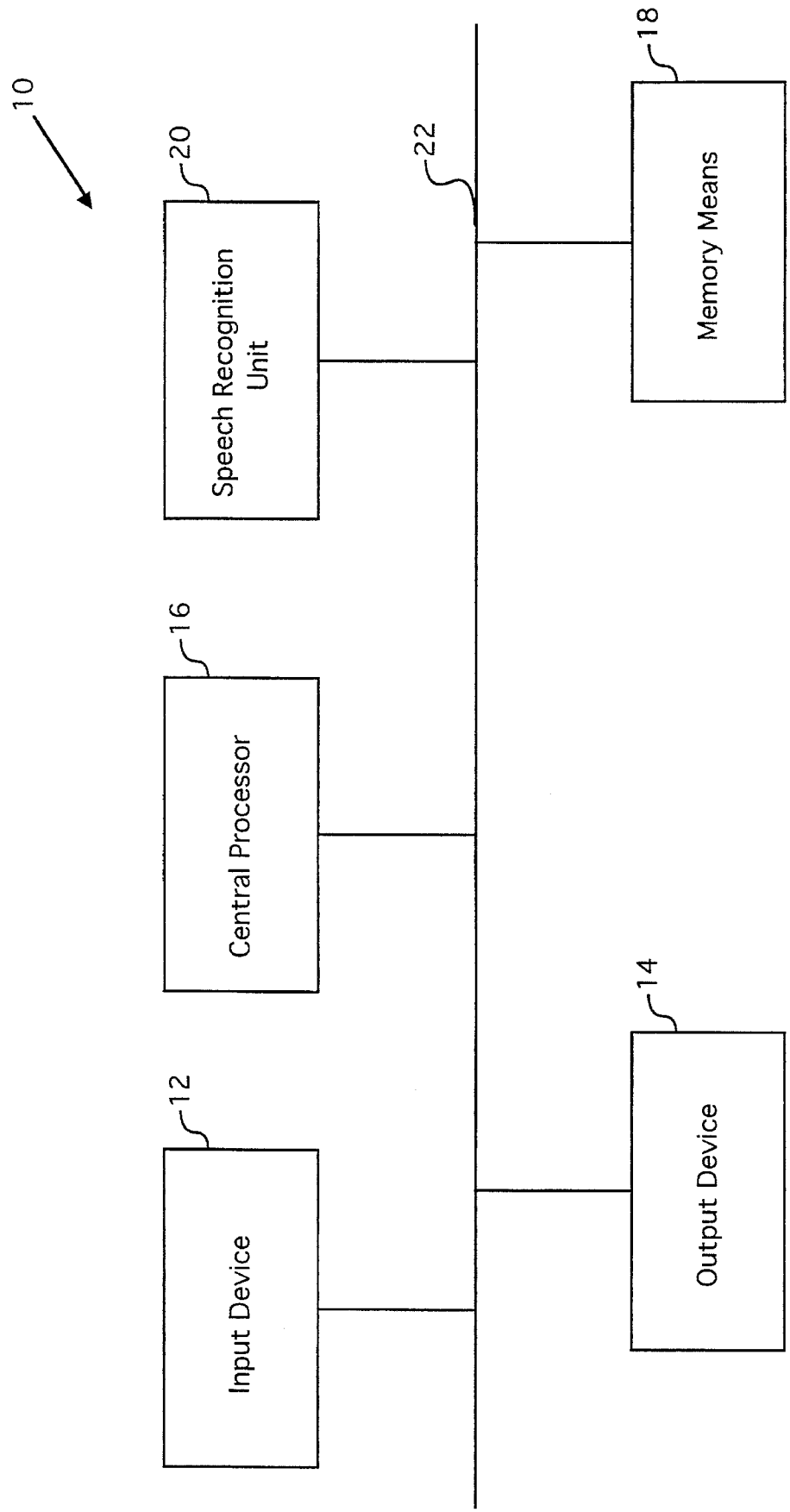
FIG. 3 is a block diagram of a second embodiment of the system of the present invention for recognizing continuous Mandarin Chinese speech.

Referring now to FIG. 3, a block diagram of a second and preferred embodiment of a system 10 for recognizing continuous Mandarin Chinese speech, constructed in accordance with the present invention, is shown. The system 10 preferably comprises an input device 12, an output device 14, a central processing unit (CPU) 16, a memory means 18, and a speech recognition unit 20. The input device 12, output device 14, central processing unit (CPU) 16, and memory means 18, are coupled in a von Neuman architecture via a bus 22 such as in a personal computer. The central processing unit (CPU) 16 is preferably a microprocessor such as a Motorola 68040; the output device 14 is preferably a video monitor; the memory means 18 comprises random access memory ("RAM") and read-only memory ("ROM") for storing data and program instruction steps. The input device 12 comprises a keyboard, mouse type controller, microphone, and A/D converter. In the preferred embodiment, the system 10 is a Macintosh Quadra 840AV computer system from Apple Computer, Inc. of Cupertino, Calif. Those skilled in the art will realize that the system 10 could also be implement on an IBM personal computer or other computer systems.

In the preferred embodiment, the speech recognition unit 20 is a memory, coupled to the bus 22, that stores a set of program instruction steps that when executed by the CPU 16 recognizes continuous Mandarin Chinese speech. The system 10 of the present invention receives audio signal inputs of continuous Mandarin Chinese speech through the microphone of the input device 12. The speech recognition unit 20 analyzes the input and produces N-best recognitions of the input. The speech recognition unit 20 preferably receives an input, analyzes the input, and generates a plurality of output signals of possible recognitions of the input signal. Each output signal includes a signal of the recognized input, referred to as a theory, and an initial confidence score. The initial confidence score indicates the confidence of the speech recognition unit 20 that the associated theory is a correct recognition of the input and is adjusted by a confidence score augmentor 24, shown in FIG. 4, according to a signal from an integrated tone classifier 32. Preferably, the speech recognition unit 20 generates one or more theories and ranks the theories by initial confidence score.

Figure 4:
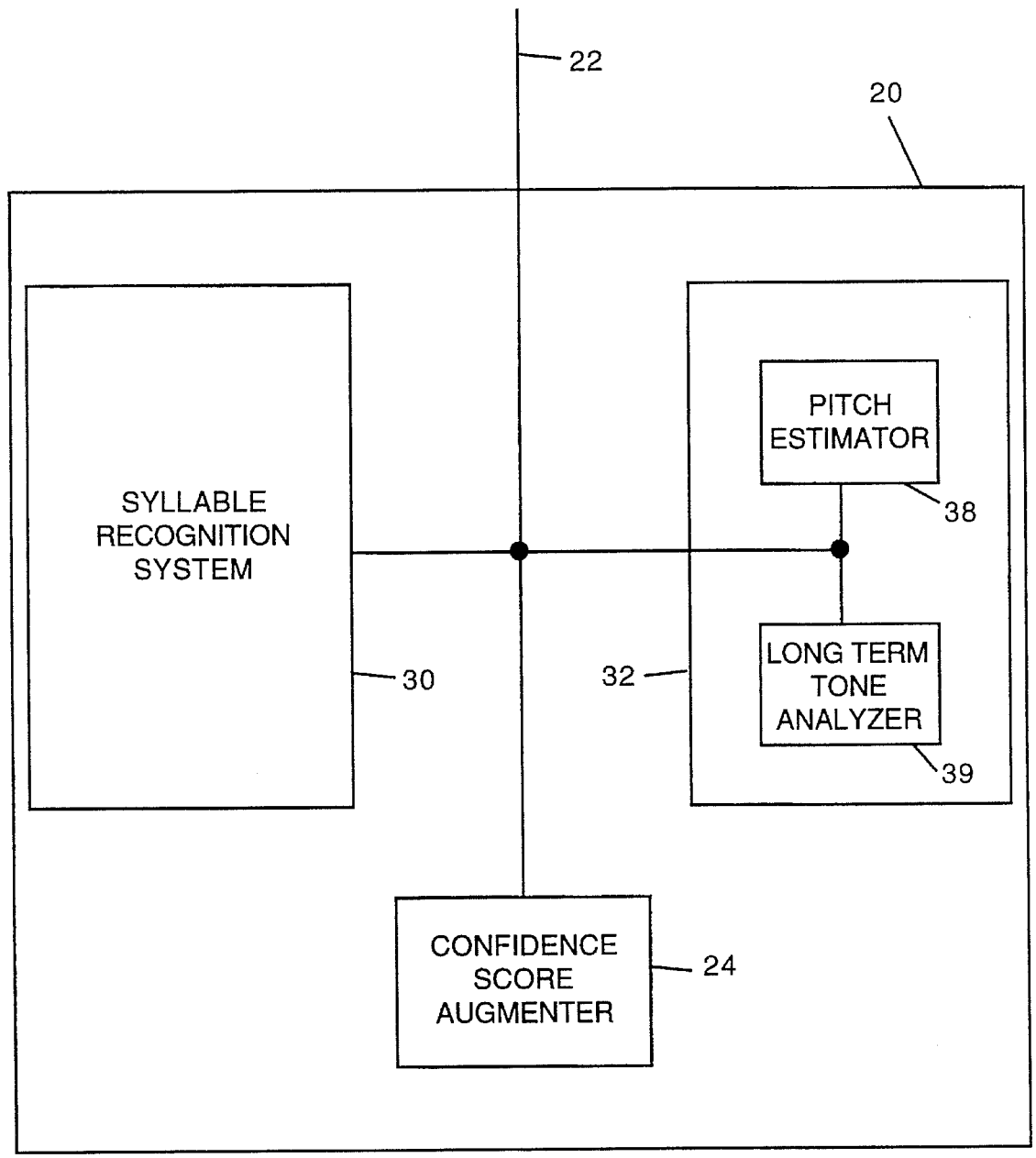
FIG. 4 is a block diagram of a preferred embodiment of the speech recognition unit of the second embodiment of the present invention.

Referring now to FIG. 4, a block diagram of the speech recognition unit 20 is shown. The speech recognition unit 20 comprises a confidence score augmentor 24, a syllable recognition system 30, and the integrated tone classifier 32. The syllable recognition system 30 receives the digitized input signal and generates N-best theories with accompanying initial confidence scores. The syllable recognition system 30 is preferably the Apple Plaintalk Chinese Syllable Recognition System from Apple Computer, Inc. of Cupertino, Calif. As was discussed with reference to FIG. 2, the syllable recognition system 30 determines the phonetic structure of each portion of each segmentation pattern and might perform short-term tonal analysis. The syllable recognition system 30 generates an initial confidence score for each theory and ranks the theories by initial confidence score. The syllable recognition system 30 then generates a signal to transmit the N-best theories, with accompanying initial confidence scores, on the bus 22 to the integrated tone classifier 32 and to the confidence score augmentor 24.

The integrated tone classifier 32 is coupled to the bus 22 to receive the digitized input signal from the A/D converter and the N-best theories from the syllable recognition system 30. The integrated tone analyzer 32 comprises a pitch estimator 38 and a long-term tone analyzer 39. The pitch estimator 38 estimates the pitch of the entire input signal and transmits the result to the long-term tone analyzer 39. The pitch estimator 38 preferably estimates the pitch only once. By estimating the pitch only once, the integrated tone classifier 32 greatly speeds the long-term analysis of the N-best theories. The long-term tone analyzer 39 segments the estimated pitch according to the syllables of the N-best theories generated by the syllable recognition system 30, determines the tone of each syllable of each of the N-best theories, and generates a long-term tonal confidence signal for each theory. The integrated tone classifier 32 has an output coupled to the bus 22 through which it asserts the long-term tonal confidence signal in the bus 22 to the confidence score augmentor 24.

The confidence score augmentor 24 has a first input and a second input, both coupled to the bus 22 to receive the long-term tonal confidence signals from the integrated tone classifier 32 and the N-best theories, with associated initial confidence scores, from the syllable recognizer 30, respectively. The confidence score augmentor 24 modifies each initial confidence score according to the corresponding long-term tonal confidence signal, re-ranks the theories according to their augmented confidence scores, and generates a signal to output the N-best theories with augmented confidence scores. The confidence score augmentor 24 is coupled to the bus 22 to output the N-best theories with augmented confidence scores.

Figure 5:
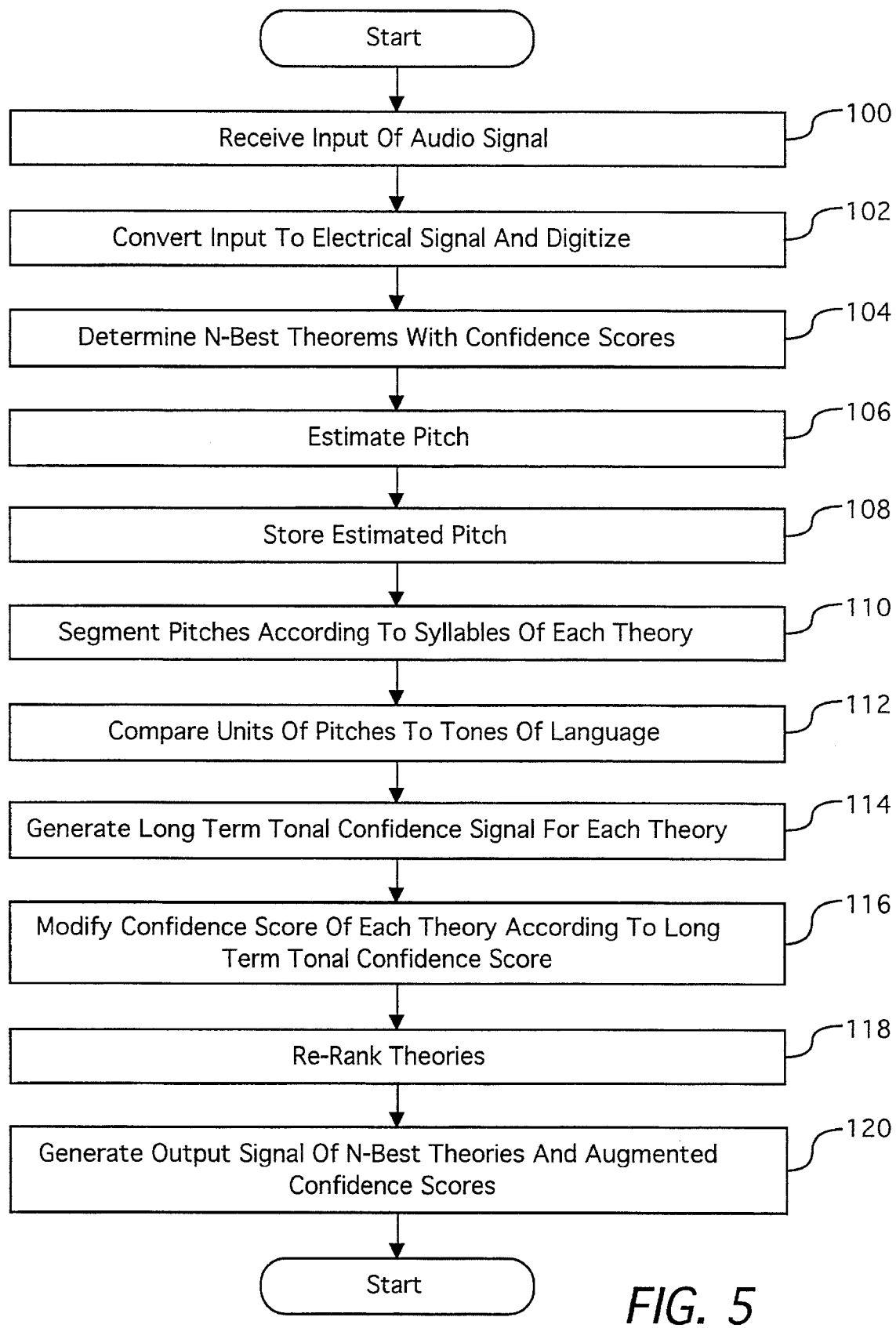
FIG. 5 is a flowchart of a preferred method of the present invention for recognizing continuous Mandarin Chinese speech.

Referring now to FIG. 5, a flow chart of a preferred method for analyzing an input of continuous Mandarin Chinese speech using the present invention is shown. The method begins in step 100 where the system 10 receives an input of continuous Mandarin Chinese speech. In step 102, the microphone of the input device 12 converts the audio signal into an analog, electrical signal, and the A/D converter of the input device 12 digitizes the input signal. In step 104, the syllable recognition system 30 processes the input and generates multiple theories with corresponding initial confidence scores. The syllable recognition system 30 outputs the N-best theories according to the initial confidence scores. N is a number selected by the system developer according to his/her application's requirements. If the syllable recognition system 30 can not generate more than N theories for an input, it outputs all the theories, ranked by initial confidence score, that it can generate.

In step 106, the pitch estimator 38 receives the digitized input signal from the input device 12 and estimates the pitch of the input signal. The method preferably estimates the pitch only once because estimating pitch is very computationally expensive. The present invention overcomes the deficiencies of the prior art by using long-term tonal analysis but avoids succumbing to computational overhead of estimating the pitch multiple times. Those skilled in the art will realize that step 106 may be performed concurrently with step 104. The pitch estimator 38 uses fourier analysis or a low pass filter to estimate the fundamental frequency of the input signal. Those skilled in the art will realize that many other methods may be used to estimate the pitch. In step 108, the long-term tone analyzer 39 receives the estimated pitch from the pitch estimator 38 and stores the estimated pitch.

In step 110, the long-term tone analyzer 39 segments the estimated pitch into units according to the syllable segmentation of each of the N-best theories. In this way, the integrated tone classifier 32 uses the syllable recognition 30 as a sophisticated segmenter to divide the input syllables into reliable syllable segments for long-term tonal analysis. The syllable recognition system 30 provided the N-best theories that already closely approximate the correct segmentation. By using the syllable recognition system 30 for segmenting the estimated pitch into multiple syllable segments, the present invention reduces the effects of segmentation error. The units are then compared, in step 112, to the tones of the language by the long-term tone analyzer 39. The long-term tone analyzer 54 preferably uses the method described in co-pending U.S. patent application entitled "A System And Method For Determining The Tone Of A Syllable Of Mandarin Chinese Speech," which is incorporated herein by reference. The long-term tone analyzer 39 generates a long-term tonal confidence signal for each theory in step 114. The long-term tonal confidence signal indicates how well the units match the tones of the language. As with the other scores, the long-term tonal confidence signal is normalized so that the long-term tonal confidence signals of theories having different numbers of syllables may be compared.

The confidence score augmentor 24 then, in step 116, receives the theories, with their initial confidence scores, from the syllable recognition system 30 and receives the long-term tonal confidence signals from the integrated tone classifier 32. The confidence score augmentor 24 modifies the initial confidence scores of each theory according to the long-term tonal confidence signal that corresponds to the theory. The confidence score augmentor 24 then re-ranks, in step 118, the theories according to the augmented confidence scores. Finally, in step 120, the confidence score augmentor 24 generates an output signal for the speech recognition system 10 of the N-best theories and their augmented confidence scores. The method then ends.

While the present invention has been described with reference to certain preferred embodiments, those skilled in the art will recognize that various modifications may be provided. It is not required that the initial confidence score and tonal score indicate greater confidence or match by a more positive value. The initial confidence score may be augmented in any manner, not only by addition of the long-term tonal confidence signal to the initial confidence score. Furthermore, the present invention may be used to recognize any tonal language, such as Cantonese, and is not limited to Mandarin Chinese. The present invention may also be used with handwriting recognition systems and other data recognition systems. These and other variations upon and modifications to the preferred embodiments are provided for by the present invention, which is limited only by the following claims.

What is claimed is:

1. An integrated tone classifier for performing long-term tonal analysis of an input signal of continuous speech of a tonal language, the integrated tone classifier comprising:

a pitch estimator, having an input coupled to receive the input signal and an output, for estimating the pitch contour of the input signal; and a long-term tone analyzer, having an input coupled to the output of the pitch estimator and an output forming an output of the integrated tone classifier, for segmenting an estimated pitch contour generated by the pitch estimator into units and for performing long-term tonal analysis on the units of the segmented, estimated pitch.

2. The system of claim 1, wherein the pitch estimator comprises a memory device, coupled to a processor, the memory device having a first portion for storing program instruction steps for execution by the processor to estimate the pitch contour of the input signal.

3. The system of claim 2, wherein the long-term tone analyzer comprises a second portion of the memory device, the second portion of the memory device for storing instruction steps for execution by the processor to segment an estimate pitch contour generated by the pitch estimator into units and to perform long-term tonal analysis of the units of the segment, estimated pitch.

4. The system of claim 1, wherein the pitch estimator uses fourier analysis to determine the pitch contour of the input signal.

5. The system of claim 1, wherein the pitch estimator uses a low pass filter to determine the pitch contour of the input signal.

6. The system of claim 1, wherein the pitch estimator determines a pitch only once for the entire input signal.

7. A system for recognizing an input signal of continuous speech of a tonal language, the system comprising:

a syllable recognition system, having an input and an output, for determining phonetic structures of syllables, for performing short-term tonal analysis of the input, and for generating N-best theories with initial confidence scores, the input of the syllable recognition system coupled to receive the input signal; and an integrated tone classifier, having a first and second input and an output, the first input coupled to receive the input signal and the second input coupled to the output of the syllable recognition system to receive the N-best theories with initial confidence scores, for performing long-term tonal analysis to determine the tone of syllables of the theories and for generating a long-term tonal confidence signal for each theory.

8. The system of claim 4, wherein the integrated tone classifier comprises:

a pitch estimator, having an input coupled to receive the input signal and an output, for estimating the pitch contour of the input signal; and a long-term tone analyzer, having a first input coupled to an output of the pitch estimator and a second input coupled to an output of the syllable recognition system and an output forming the output of the integrated tone classifier, for segmenting an estimated pitch contour generated by the pitch estimator into units according to an output of the syllable recognition system and for performing long-term tonal analysis on the units of the segmented, estimated pitch.

9. The system of claim 8, wherein the long-term tone analyzer generates a long-term tonal confidence signal indicating how well the units of a segmented, estimated pitch contour match the tones of the tonal language.

10. The system of claim 9, further comprising a confidence score augmentor, having a first input coupled to the output of the integrated tone classifier and a second input coupled to the output of the syllable recognition system, for modifying an initial confidence score generated by the syllable recognition system according to a long-term tonal confidence signal generated by the integrated tone classifier to generate an augmented confidence score.

11. The system of claim 10, wherein the confidence score augmentor comprises:

a first portion of a memory device, the memory device coupled to a processor, the first portion of the memory device for storing program instruction steps for execution by the processor to modify an initial confidence score generated by the syllable recognition system according to a long-term tonal confidence signal generated by the tone classifier to generate an augmented confidence score.

12. The system of claim 11, wherein the syllable recognition system comprises a second portion of the memory device, the second portion of the memory device for storing program instruction steps for execution by the processor to perform short-term tonal analysis of the input signal and for generating N-best theories with initial confidence scores.

13. The system of claim 12, wherein the integrated tone classifier comprises a third portion of the memory device, the third portion of the memory device for storing program instruction steps for execution by the processor to receive the N-Best theories with initial confidence scores, to perform long-term tonal analysis to determine the tone of syllables of the theories, and to generate a long-term tonal confidence signal for each theory.

14. The system of claim 10, wherein the confidence score augmentor determines an augmented confidence score by adding a long-term confidence score signal and an initial confidence score.

15. The system of claim 10, wherein the confidence score augmentor re-ranks the N-best theories according to the augmented confidence scores.

16. A method for recognizing an input signal of continuous speech, having a pitch, of a tonal language, the method comprising the steps of:

determining N-best theories with initial confidence scores;

estimating the pitch contour of the input signal;

segmenting the pitch contour into units according to each of the N-best theories;

comparing the units to the tones of the tonal language;

generating a long-term confidence signal for each theory, the long-term confidence signal indicating how well the units of a theory match the tones of the tonal language; and modifying an initial confidence score according to a long-term tonal confidence signal to generate an augmented confidence score.

17. The method of claim 16 further comprising the steps of:

ranking the N-best theories according to the augmented confidence scores; and generating an output signal of the N-best theories with augmented initial confidence scores.

18. A system for recognizing an input signal of continuous speech of a tonal language comprising:

means for determining N-best theories with initial confidence scores;

means for estimating the pitch contour of the input signal;

means for segmenting the pitch contour into units according to each of the N-best theories;

means for comparing the units to the tones of the tonal language; and means for modifying an initial confidence score according to a long-term tonal confidence signal to generate an augmented confidence score.

19. The system of claim 18 further comprising means for generating a long-term tonal confidence signal for each theory.

20. The system of claim 19 further comprising:

means for ranking the N-best theories according to augmented confidence scores; and means for generating an output signal of the N-best theories with augmented confidence scores.

* * * * *